United States Patent

[11] 3,593,720

[72] Inventors John R. Botterill
 Rugby;
 Kepkay: Leslie L., Leamington Spa; Philip L. Dodd, Coventry; William J. Radburn, Kenilworth, all of, England
[21] Appl. No. 803,791
[22] Filed Mar. 3, 1969
[45] Patented July 20, 1971
[73] Assignee Massey-Ferguson Services N.V.
 Curacao, Netherlands
[32] Priority Mar. 6, 1965
[33] Great Britain
[31] 10777/68

[54] COMBINE GRAIN LOSS SIGNAL
 4 Claims, 10 Drawing Figs.
[52] U.S. Cl. .................................................. 130/27 W,
 56/DIG. 15
[51] Int. Cl. ...................................................... A01f 12/52
[50] Field of Search ........................................... 130/27,
 27.6, 27.19, 24

[56] References Cited
UNITED STATES PATENTS
2,255,193 9/1941 Steelman ...................... 130/27.6
FOREIGN PATENTS
53,446 1/1967 Germany ..................... 130/27.19

Primary Examiner—Antonio F. Guida
Attorney—Tweedale & Gerhardt

ABSTRACT: A combine harvester thresher grain loss monitor which includes, a secondary grain separating and cleaning apparatus which receives at least part of the crop material expelled from the primary grain separating and cleaning apparatus and separates and cleans any grain still present in the crop material, an electronic apparatus to measure the flow rate of cleaned grain discharged from the secondary grain separating and cleaning apparatus, and an indicator which indicates the flow rate of the grain which the primary grain separating and cleaning apparatus failed to separate and clean.

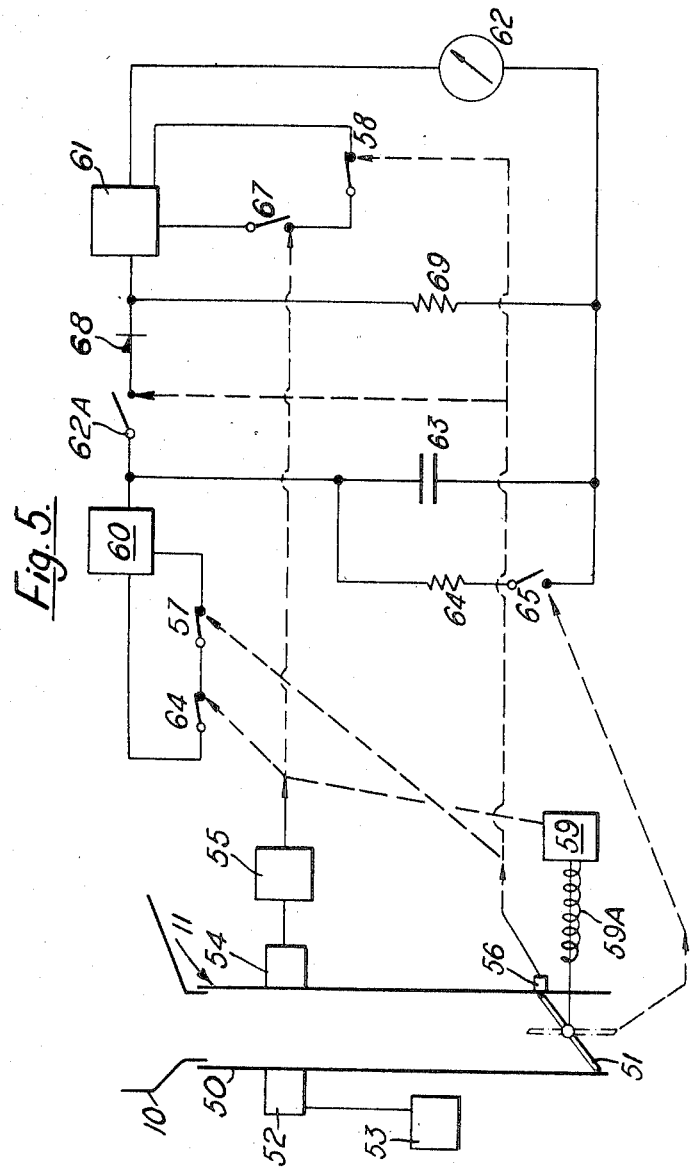

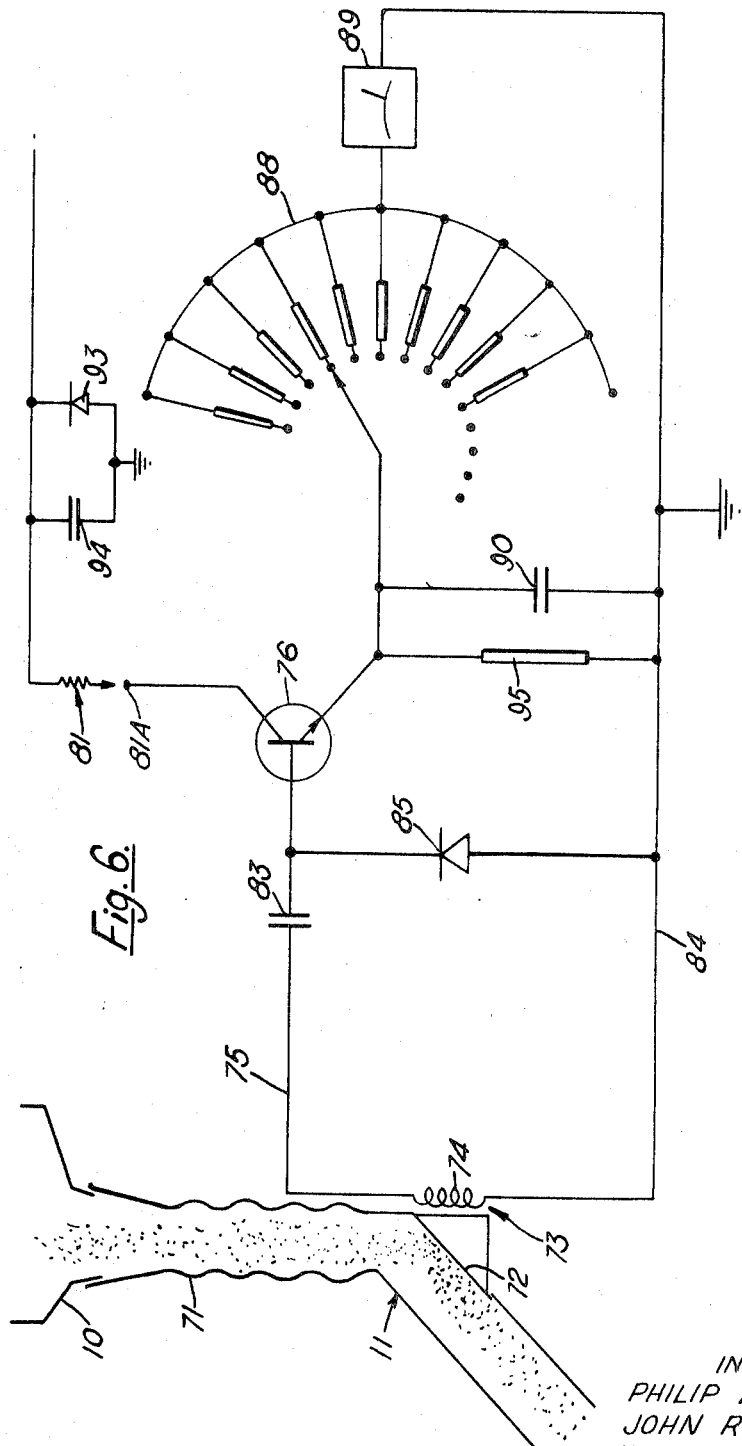

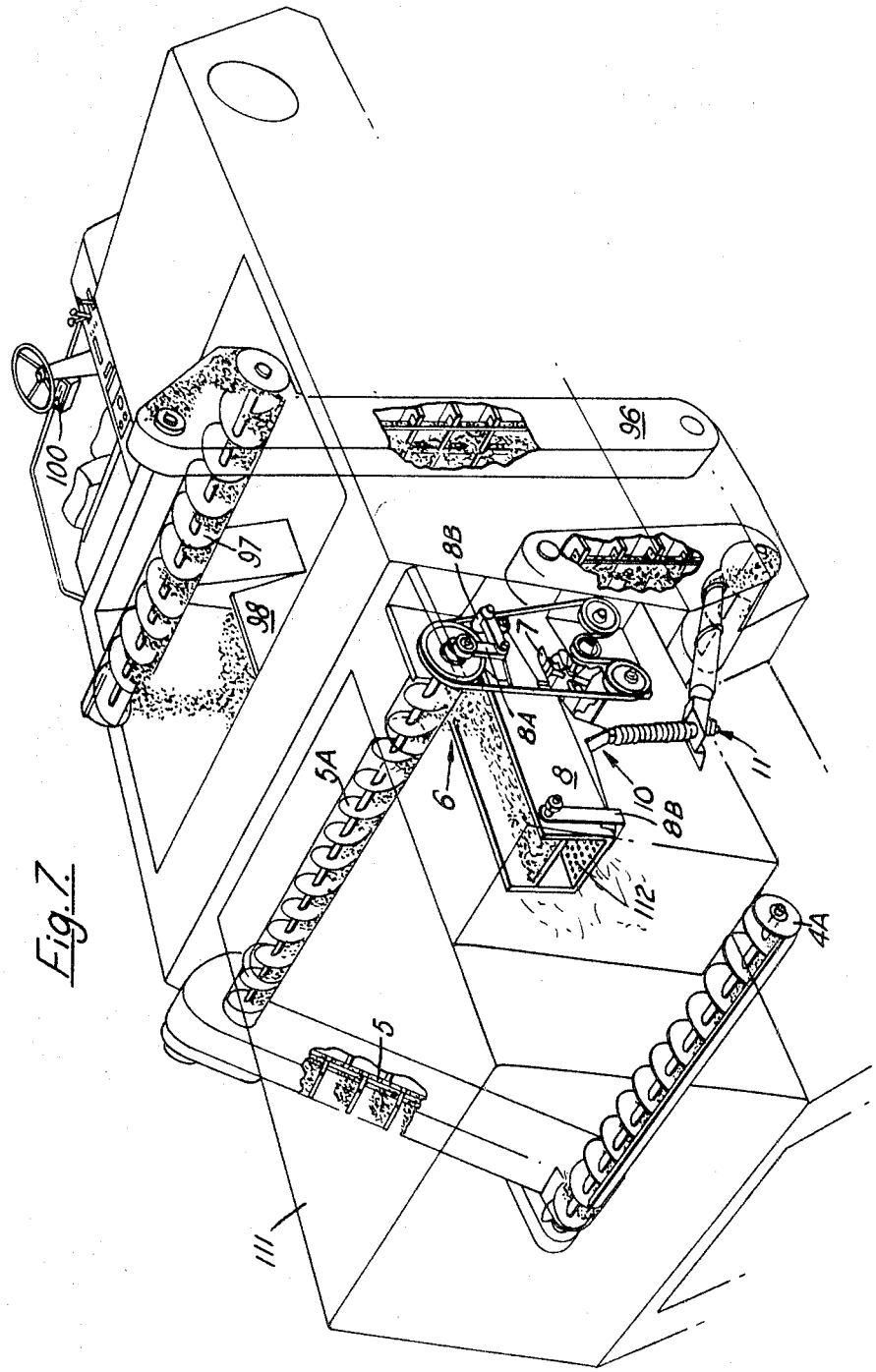

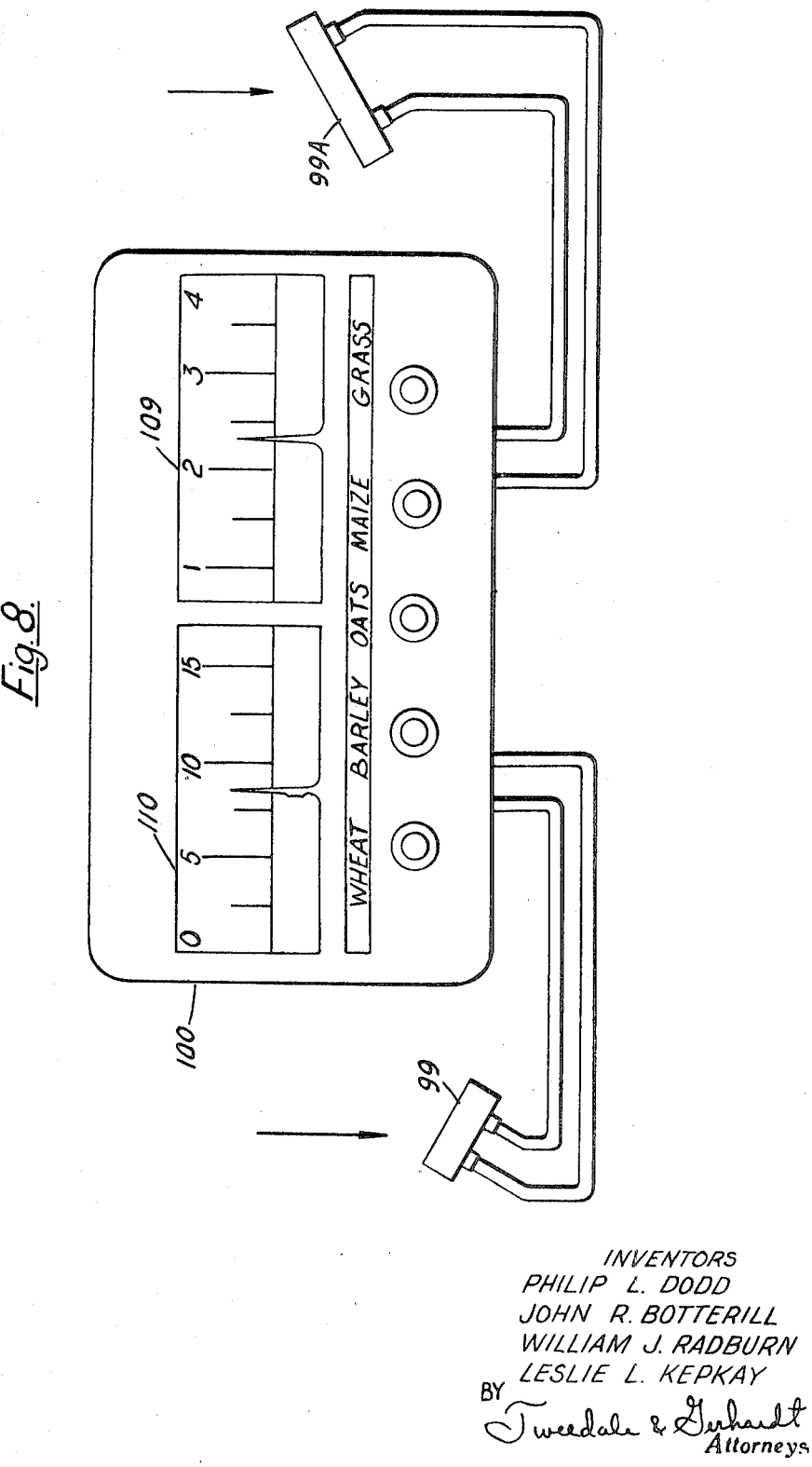

COMBINE GRAIN LOSS SIGNAL

This invention relates to combine harvester threshers and more particularly to an apparatus for determining the amount of grain lost from the grain separating and cleaning apparatus of a combine harvester thresher.

The usual method used to determine the efficiency of a combine harvester thresher is to count the kernels of grain on the ground after the machine has harvested the crop. This method takes time and is inaccurate since it is very difficult to find and count all the kernels on the ground. When kernels of grain are found on the ground, it is very difficult to tell what caused the kernels to be lost especially since some grain is usually on the ground before the crop is harvested. Since crops very from one part of the field to another and from 1 hour to the next, it is desirable to continuously determine the efficiency of combines. To overcome these problems, the operators of combines have needed an indicator which will show the efficiency of the grain separating and cleaning apparatus at any given time so that they can make instantaneous adjustments in the combine harvester thresher to control the efficiency.

The primary object of the present invention is to provide in a combine harvester thresher an apparatus for checking the efficiency of the grain cleaning or separation process. The efficiency of the grain cleaning or separating apparatus is determined by adding a secondary grain separating and cleaning apparatus to separate and clean any grain remaining in all or a portion of the straw expelled from the primary separating and cleaning apparatus and measuring the rate of flow of cleaned grain discharged from the secondary grain separating and cleaning apparatus. The rate of flow of cleaned grain from the secondary separating and cleaning apparatus represents all or a portion of the grain lost by the primary grain separating and cleaning apparatus. The rate of flow of cleaned grain discharged from the secondary grain separating and cleaning apparatus can be determined by measuring the time required to discharge a predetermined quantity of cleaned grain, by measuring the quantity of cleaned grain discharged in a predetermined time, or by measuring the flow rate directly by determining the quantity of grain which impinges against the diaphragm of an electromechanical transducer. An indicator can be provided to show the flow rate which is measured. If desired, the rate of flow of cleaned grain from the primary separating and cleaning apparatus can also be measured, compared with the rate of flow of cleaned grain from the secondary separating and cleaning apparatus, and an indicator can be provided which will indicate the efficiency of the primary separating and cleaning apparatus as a proportion of the grain cleaned. The indicator can be calibrated to indicate the total rate of grain loss from the primary separating and cleaning apparatus when only a portion of the grain lost is cleaned by the secondary separating and cleaning apparatus. The operator can adjust the ground speed of the combine harvester thresher or make other adjustments necessary to keep the efficiency within acceptable limits.

Embodiments of the invention will now be described, by way of example, with reference to the accompanying diagrammatic drawings, in which:

FIG. 5 is an enlarged detailed schematic view of a fourth embodiment of a grain-flow measuring device which measures the time required to collect a given quantity of grain;

FIG. 6 is an enlarged detailed schematic view of a fifth embodiment of a grain-flow measuring device which employs an electromechanical transducer to measure the instantaneous rate of flow of grain;

Figure 7A:
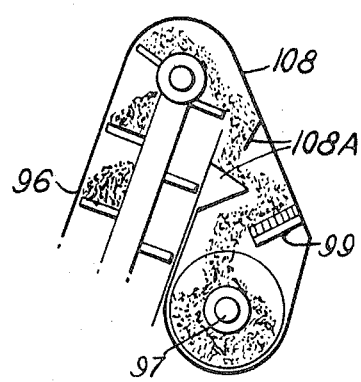
FIG. 7A is an enlarged detailed view of the top of the elevator as shown in FIG. 7, including an electromechanical transducer to measure the flow rate of grain into the main storage bin.
Figure 7B:
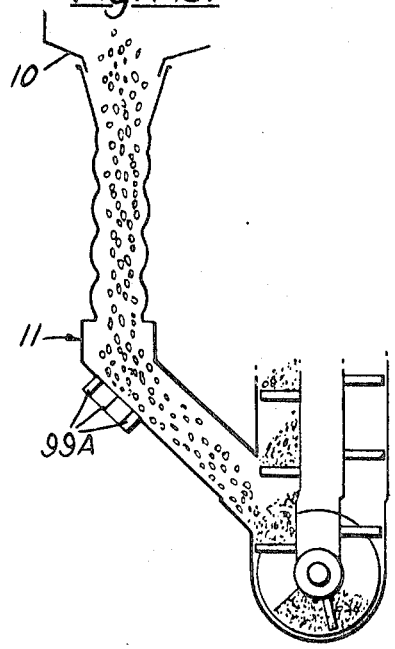
FIG. 7 is a perspective view of part of another combine harvester.

FIG. 7B s an enlarged detailed view of the outlet chute for the secondary cleaning apparatus of FIG. 7, including an electromechanical transducer to measure the flow rate of grain from the secondary cleaning apparatus; and FIG. 8 is a combine-performance efficiency-indicator.

Figure 1:
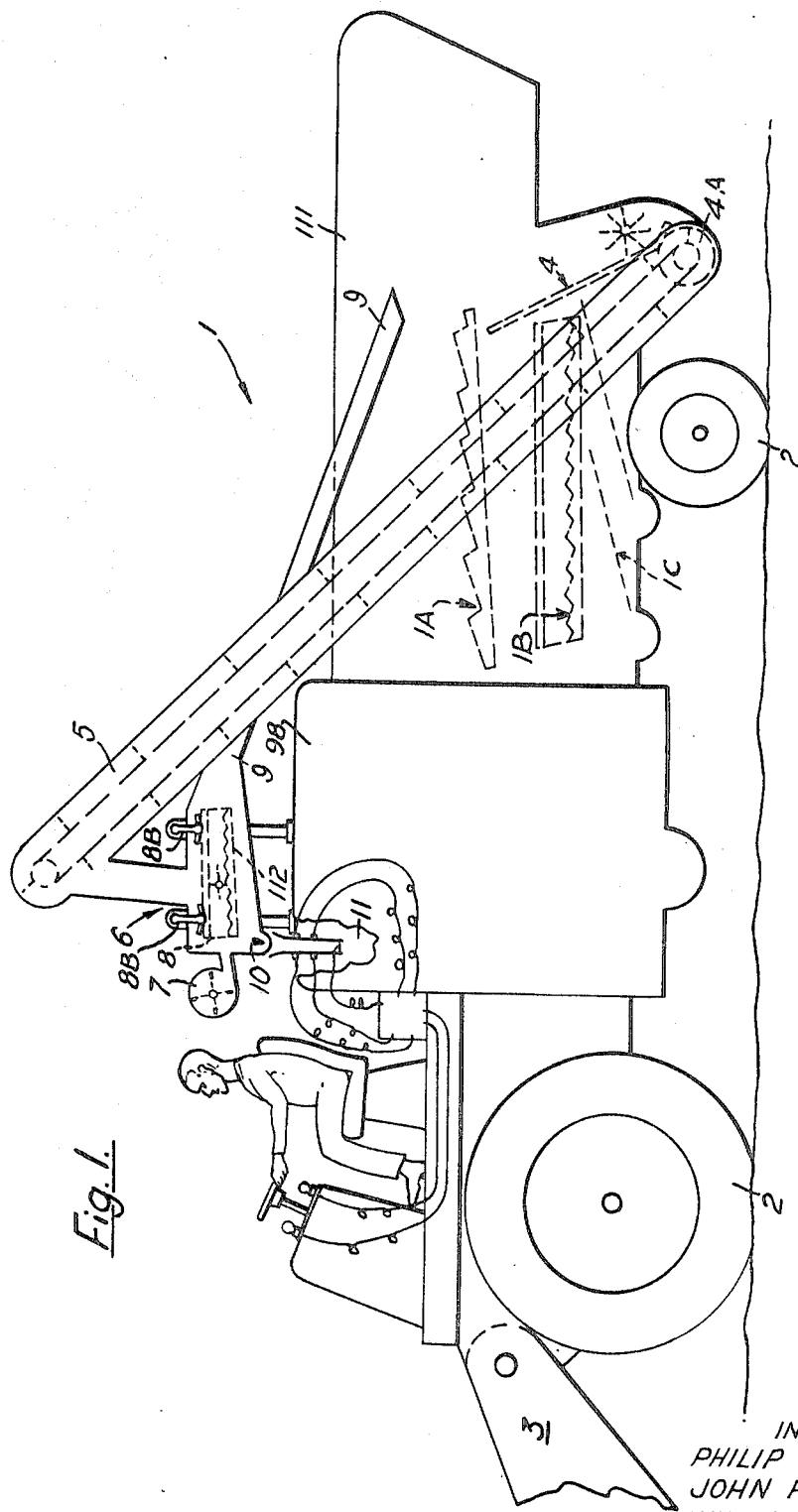
FIG. 1 is a side view of a combine harvester having means for checking the efficiency of the grain-cleaning process including apparatus for detecting the rate of flow of grain according to the present invention.

As shown in FIG. 1, a combine harvester has ground-engaging wheels 2 and, at the forward end of the harvester, a header 3 including a pickup reel (not shown).

In use, cut crop is passed from the header 3 to a threshing mechanism (not shown) and thence to primary grain-cleaning apparatus including straw walkers 1A, a shaker shoe 1B and a unit 4. Straw and grain which has not been separated are discharged from the rear end of the straw walkers 1A into the unit 4, and some of this grain is separated by the unit 4 which is described in our U.S. Pat. No. 3,324,860.

The grain which is separated by the unit 4 is fed by an elevator 5 to secondary cleaning-apparatus 6 which includes a fan 7, a small shaker shoe 8, and an exhaust duct 9 for the removal of straw and waste material separated from the mixture in the apparatus 6.

The shaker shoe 8 is pivotally mounted by crank arms 8B on the housing 111 of the combine harvester 1, and has a perforated lower plate or tray 112 through which grain may pass, the perforations being sufficiently small in size to prevent the passage of straw therethrough. Thus, in operation, during mechanical vibration of the shaker shoe 8, waste material, straw and grain are subjected to a secondary cleaning-process, straw and waste material being blown by a stream of air from the fan 7 into the exhaust duct 9, and clean grain being discharged through an outlet chute 10 to be collected by a main grain-storage bin (not shown).

Apparatus for detecting the rate of flow of grain is associated with the chute 10 in the form of a grain-flow measuring device 11 by means of which the rate of flow of clean grain can be measured and may be displayed in a convenient fashion at the operator's platform.

The quantity of clean grain recovered from the shaker shoe 8 is dependent upon the quantity of grain collected at the unit 4, and since the unit 4 collects a relatively constant percentage of the grain discharged from the rear end of the straw walkers 1A, the measuring device 11 provides a measure of the grain lost in the primary cleaning apparatus, and therefore a measure of the grain-separating efficiency of the combine harvester.

Figure 2:
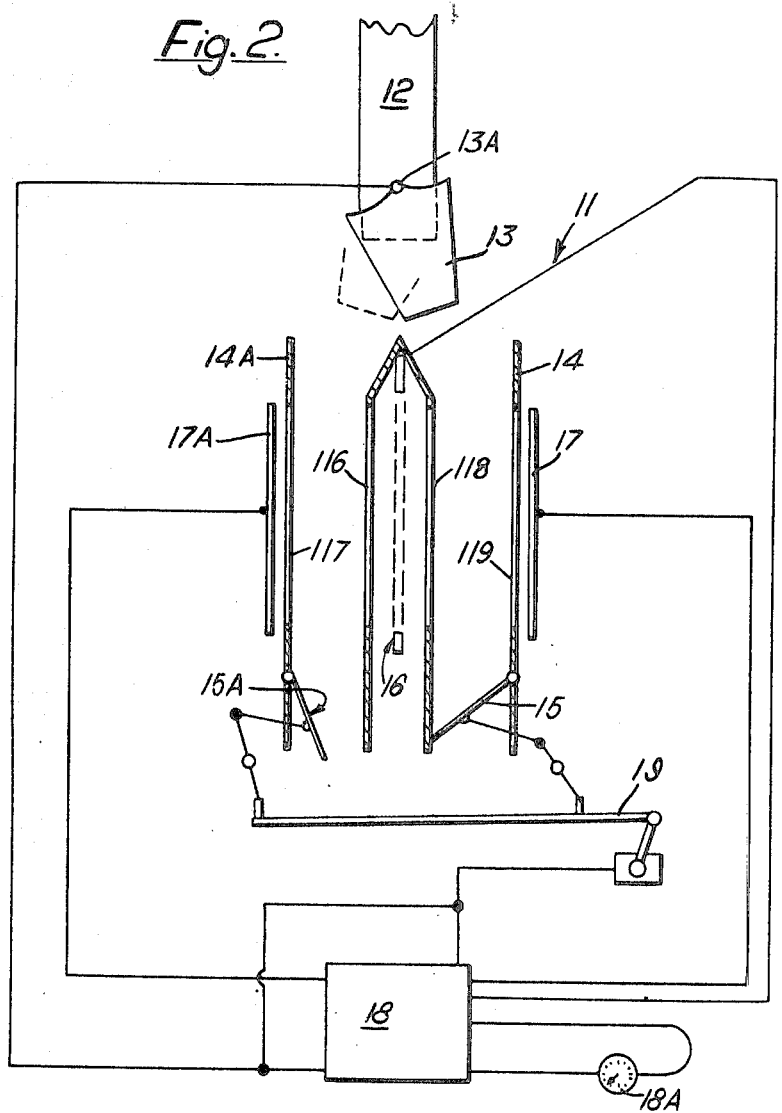
FIG. 2 is an enlarged detailed schematic view of the first embodiment of a grain-flow measuring device that employs photoelectric cells to measure the quantity of grain which enters the device in a given time.

As shown in FIG. 2, one embodiment of the grain-flow measuring device 11 includes ducting in the form of a chute 12 through which clean grain from the shaker shoe 8 falls. The chute 12 has at its lower end means in the form of a pivotal deflector 13 pivotally attached to chute 12 by pivot 13A which may be moved to deflect grain into either one of two tubular members or ducts, 14 or 14A, which have closure flaps 15 and 15A respectively. The latter are interconnected by an articulated mechanical linkage 19 which, when operated, causes movement of the closure flaps 15 and 15A so that one duct is open while the other is closed. Thus, grain may be collected temporarily in one of the ducts 14 and 14A.

Parts 116, 117, 118 and 119 of the walls of the ducts 14 and 14A are optically transparent so that light emitted from a transmitter in the form of an elongate fluorescent tube 16 situated between the ducts may pass through the transparent part and be detected through the duct by a receiver in the form of a photoelectric cell 17 or 17A. Thus, in the event that one duct is filled with grain no light will be transmitted therethrough to the pertaining photoelectric cell.

Control means 18 is provided whereby the deflector 13 may be positioned selectively to feed grain into one of the ducts, and the mechanical linkage 19 is also operated by the control means 18 so that grain is collected in one duct and discharged from the other duct. The control means 18 is connected to the cells 17 and 17A so that the cell associated with the duct in which grain is being collected is operatively connected to an indicator 18A, while that cell associated with the other duct is disconnected from the indicator 18A.

In operation, the control means 18 actuates a motor (not shown) which causes the deflector 13 and the closure flaps 15 and 15A to be pivoted in a preselected fashion. Thus, for example, grain is collected over a time interval of, say, 20 seconds in the duct 14, the cells 17, 17A detect the quantity of grain collected, the control means 18 then operates so that the flap 15 opens and the collected grain is released, while the flap 15A closes and the deflector 13 swings to the left in FIG. 2, and the duct 14A collects further grain falling through the chute 12. The time interval may be selected and adjusted as desired within the limits of capability of the control means 18, of the storage capacity of the ducts 14, 14A and of the sensitivity of the cells 17, 17A.

Figure 3:
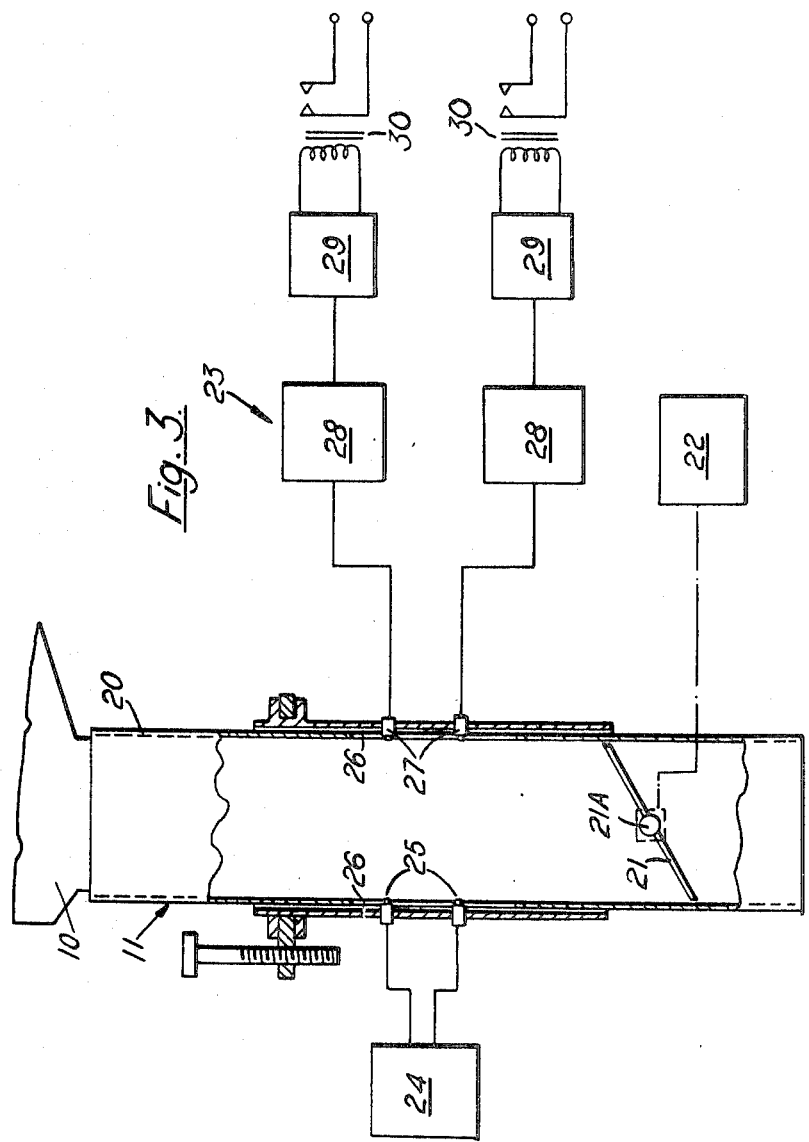
FIG. 3 is an enlarged detailed schematic view of a second embodiment of a grain-flow measuring device that employs an ultrasonic transmitter and receiver to warn the operator if an excess quantity of grain has entered the device in a given time interval.

In a second embodiment of the grain-flow measuring device 11 shown in FIG. 3 ducting in the form of a single duct 20 has a pivotally mounted closure device or flap 21 pivotally supported by shaft 21A which is operated in conjunction with control means 22, and detecting means is provided including an electrically operating sensor 23 having two identical channels, each fed from a single oscillator 24.

Each channel of the sensor 23 includes an ultrasonic transmitter 25 electrically connected to the oscillator 24, and the duct 20 has a window with which the transmitter 25 is associated, as in an ultrasonic receiver 27, so that, in the absence of grain, the ultrasonic signal emitted from the transmitter 25 is received by the pertaining receiver 27 and is thereafter converted into an electrical signal which is passed to an amplifier 28 and an amplitude comparator 29 wherein the signal is compared in amplitude with a reference signal and the output operates a relay 30 which in turn may operate a colored light-bulb (not shown).

The two channels have the two transmitter-receiver pairs spaced vertically apart externally of the duct 20 on a tubular structure which may be vertically adjusted relative to the duct 20.

In operation, the presence of grain in the path of the ultrasonic signal causes a reduction in amplitude of the electrical signal fed to the amplitude comparator 29, so that the presence or absence of grain in the path of the ultrasonic signal may be determined. That is, this device operates as an on/off system.

In one example of an indicator suitable for use with this type of measuring device, the relays at the output of the two channels of the sensor 23 are connected to light bulbs of different colors which are mounted on the operator's platform, and, if the grain level is above the level of the pertaining receiver 27, the light is illuminated, whereas, if the grain has not reached the critical level, the bulb is extinguished. If both light bulbs are extinguished, the grain level is below the receivers, and, if both lights are illuminated, the grain level is above the receivers.

The control means 22 may be adjusted so that any period of time may be selected, as desired, within the capabilities of the system, and the positioning of the transmitter and receivers may also be adjusted relative to the duct, thereby providing further adjustment of the system.

Figure 4:
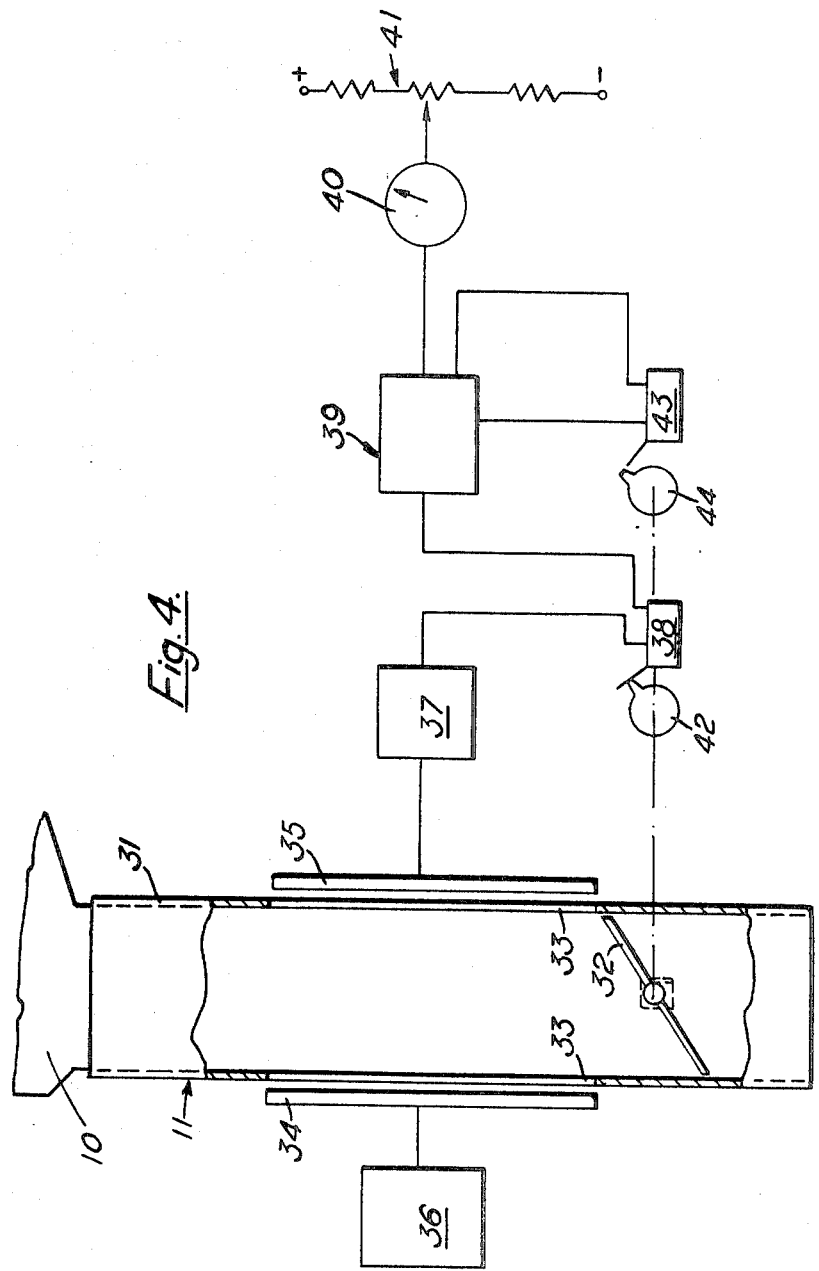
FIG. 4 is an enlarged detailed schematic view of a third embodiment of a grain-flow measuring device that employs piezoelectric transducers to measure the quantity of grain which enters the device in a given time.

A further embodiment of the grain-flow measuring device 11 is shown in FIG. 4 wherein ducting in the form of a duct 31 has a closure device or flap 32 operated by control means in a manner similar to that described with reference to FIG. 3, and the duct 31 includes a window 33 through which signals emitted from a transmitter 34 may pass to a receiver 35.

In this embodiment, the transmitter 34 and the receiver 35 are elongate piezoelectric transducers, and each is in close proximity to the window 33, and the duct 31, so that there is efficient coupling between the transmitter and the receiver.

The transmitter 34 is electrically connected to an oscillator 36, and, in operation the signal emitted from the transmitter 34 is received by the receiver 35, is converted into an equivalent electrical signal which is amplified by an amplifier 37 and passed selectively through a microswitch 38 to a peak-hold unit 39.

An indicator 40 is connected to the output of the peak-hold unit 39 and to a constant-voltage supply 41.

In operation, the control means operates the closure flap 32 in a manner similar to that described with reference to FIG. 3, and as the quantity of grain collected in the duct 31 increases so the electrical signal from the receiver 35 decreases to a minimum value which occurs at the end of the predetermined time-interval when the control means again operates the closure flap 32 to allow the grain to be discharged.

Prior to this discharge movement of the closure flap 32, but towards the end of the time interval, the control means operates the microswitch 43 by the cam 44. Thus, the peak-hold unit 39 is reset and thereafter the control means operates the microswitch 38 by the cam 42 so that the electrical signal from the amplifier 37 is passed to the peak-hold unit 39 and is registered on the indicator 40, and this value of signal is stored or held in the peak-hold unit 39 thereby enabling the indicator to maintain a relatively steady display which may be quickly and easily read by an operator, until such time as the cycle is repeated.

The switch 38, which is operated by the control means, acts to feed an electrical signal from the amplifier 37 to the input of the peak-hold unit 39 during the very short period of time when the quantity of grain collected in the duct 31 is substantially at its maximum. At all other periods of the cycle, the switch 38 disconnects the peak-hold unit 39 from the output of the amplifier 37.

The short period of time during which the output of the amplifier 37 is connected to the peak-hold unit 39 need not be prior to the opening of the closure flap 32 to permit the collected grain to discharge, but may, for example, be such that discharge of the grain commences during that short period. It will be appreciated, however, that the cam 44 and the cam 42 cannot be mutually adjusted, as the operation of the peak-hold unit 39 must remain synchronized with that of the switch 38; this is indicated diagrammatically by the broken line in FIG. 4.

In the apparatus described with reference to FIGS. 2, 3, and 4 the quantity of grain collected in a predetermined time interval is measured. That is, the duct closure flap is arranged to operate so that grain is collected in the duct during a fixed time interval of, say, twenty seconds and thereafter is discharged from the duct before the cycle recommences.

In a further embodiment of grain-flow measuring apparatus shown in FIG. 5, ducting in the form of a duct 50 has a closure device or flap 51, and a transmitter 52 is electrically connected to an oscillator 53 and, in operation, transmits a signal through the duct 50 to a receiver 54 forming part of a detecting means. The output signal from the receiver 54 is fed to a comparator or signal detector 55.

An indicator 62 is operated by the output signal from a peak-hold unit 61 which has a reset circuit with switches 67 and 58 in series, the switch 67 being operated by the signal detector 55 and the switch 58 is operated by a proximity switch 56 associated with the closure flap 51. Thus, the switch 58 is shut when the closure flap 51 is in the shut position.

The closure flap 51 is under mechanical control from a drive unit 59, and operates with a time delay before commencing to open or to close. Thus, on reaching the fully open position, a time delay is introduced to delay the commencement of the closure period of the closure flap 51 so that there is sufficient time for grain collected in the duct to be discharged. Similarly when the level of grain in the duct reaches the "trip level," at which level the grain cuts off the signal between the transmitter 52 and the receiver 54, so that the signal from the detector 55 operates the flap-drive unit 59, a time delay occurs before the closure flap 51 commences to open. A spring 59A in FIG. 5 represents the time delay.

An electrically operating timing device 60 is included in the detecting means, whereby when the device 60 is in operation a constant current is fed to a capacitor 63. Switches 57 and 66 are respectively operated by the proximity switch 56 and the detector 55, whereby the operation of the device 60 is controlled in an on/off fashion. A resistor 64 is connected in parallel with the capacitor 63 for discharging purposes, and is operated by a switch 65 which is controlled by the position of the closure flap 51.

A switch 62A operated by the proximity switch 56, a diode 68, and a resistor 69, provide an alternative discharge path for the capacitor 63, and the input to the peak-hold unit 61 is obtained from the resistor 69.

FIG. 5 shows the condition of the various switches during the period when the closure flap 51 is shut and the quantity of grain is increasing and is below the level of the transmitter 52. The switch 62A is open; the switches 66, 57 and 58 are shut, and the switches 65 and 67 are open; the output current from the device 60 is causing the capacitor 63 to charge.

It will now be assumed that the grain level has reached the transmitter 52 thereby causing the "trip level" to be reached. The output signal from the detector 55 causes the switch 66 to open, thus stopping the current output from the device 60 and leaving the capacitor 63 in a charged condition, while the switch 67, in closing, causes the peak-hold unit 61 to be reset, i.e. the output signal previously held by the unit 61 starts to drop to zero.

Simultaneously, the unit 59 receives an input signal from the detector 55, but, due to the time delay in the system, the closure flap does not operate for a short period. On operation of the closure flap, the proximity switch 56 opens the switch 58, closes the switch 62A and opens the switch 57. Thus, because the switch 58 is opened, the resetting action of the peak-hold unit is stopped, and, because the switch 62A is closed the capacitor 63 discharges through the resistor 69, thereby providing an input signal to the peak-hold unit 61 which holds that signal and causes it to be displayed on the indicator 62, until the resetting action is again initiated.

During the period when the closure flap is opening, the grain level drops below the transmitter 52 causing the detector 55 to operate and close the switch 66 and open the switch 67. The signal to the device 59 does not cause any modification in the operation of the closure flap 51, nor does the closing of the switch 66 operate the device 60 since the switch 57 is open during this period. When the closure flap 51 reaches the fully open position, the switch 65 closes, thereby providing a further discharge path for the capacitor 63, and a time delay occurs before commencement of the closing movement of the flap 51 when the switch 65 is reopened. When the flap 51 again reaches the closed position, the proximity switch 56 causes the switches 57 and 58 to close thereby causing the cycle to recommence.

The value of the resistor 64 and of the time delay associated with the closure flap in the fully open position are preselected so that the capacitor is fully discharged before commencement of the following cycle.

The switch 58 may be operated directly by the detector 56 with the insertion of a time-delay mechanism, but since the switches 58 and 62A are ganged together so that when one is open the other is closed, and vice versa, the operation of the switch 58 is not independent of the switch 65, so that the time delay introduced in the operation of the switch 58 must be such that the switch 58 opens before the switch 65 closes.

In this modified embodiment of the grain-flow measuring device, the transmitter and receiver may be of the type described with reference to FIG. 3.

It will also be understood that, during the time that grain is being collected in the duct, a constant current is being fed from the device 60 to be stored in the capacitor 63. Thus, since a constant quantity of grain is collected in each cycle, the charge on the capacitor when the device 60 stops feeding current is a measure of the time required to collect the quantity of grain, i.e. is a measure of the rate of grain flow.

It will be noted that in the apparatus described with reference to FIGS. 2, 3 and 4, the quantity of grain collected in a preselected period of time is measured by the apparatus, whereas in the apparatus described with reference to FIG. 5 the period of time taken to collect a preselected quantity of grain is measured.

In a further embodiment of grain-flow measuring apparatus as shown in FIG. 6, grain passing from the chute 10 enters a duct 71, the inside walls of which have corrugations thereon so as to randomize the flow of grain therethrough. The lower portion of the duct 71 is downwardly inclined at an angle of approximately 45° to the upper portion and includes at the junction of the upper and lower portions thereof a diaphragm 72 of an electromechanical transducer 73. Thus, grain in falling through the duct 71 strikes the diaphragm 72 and causes an electrical signal to be generated in a coil 74 of the transducer 73. This signal varies continuously in accordance with the amount of grain striking the diaphragm 72, and is passed along a lead 75 through a capacitor 83 to the base of a transistor 76. A diode 85 connected between the base of the transistor 76 and electrical ground, lead 84, rectifies the signal.

From the lead 84, an indicator 89 is connected in series with a switched resistor bank 88 and the emitter of the transistor 76. A damping capacitor 90 is connected in parallel with a resistor 95 between the emitter and ground, thereby preventing excessively rapid fluctuations in the signal being passed through the indicator 89. The bank 88 controls the sensitivity of the indicator 89, and the individual resistance values of the bank 88 are calibrated so that the indicator 89 may be yet to cater for crops of different moisture content.

The collector of the transistor 76, which is of NPN type, is connected through a switch 81A and a current-limiting resistor 81 to the positive terminal of a battery voltage supply (approximately 12 volts) and to stabilize the actual voltage between the collector and ground, a zener diode 93 is connected in parallel with a capacitor 94, between lead 84 and the positive terminal of the battery voltage supply.

One side of the coil 74 and the negative terminal of the battery are also connected to the ground lead 84.

In operation, a continuously fluctuating output signal from the transducer 73 is rectified and then amplified by the transistor circuit and is passed through the indicator 89, and the sensitivity of the indicator is adjustable by means of the switched resistor bank 88, with the capacitor 90 acting as a damping device to stop excessive fluctuations on the indicator 89.

In this embodiment, the rate of flow of grain recovered from the secondary cleaning-apparatus is measured continuously in contradistinction to the apparatus described with reference to FIGS. 2 to 6.

FIG. 7 shows a perspective view of another combine harvester and for consistency parts corresponding to those shown in FIG. 1 have the same numerals. Thus, in FIG. 7 there is shown the auger 4A, the elevator 5, the secondary cleaning-apparatus 6 including the fan 7, and the shaker shoe 8. There is also shown an auger 5A which feeds straw from the elevator 5 to the shaker shoe 8 together with a drive mechanism 8A which, during operation, causes the shaker shoe 8 to be vibrated mechanically. Grain recovered from the shaker shoe 8 passes through the outlet chute 10 and is conveyed to the main shaker-shoe pan 1C shown in FIG. 1 from which the grain is fed to an elevator 96, connected to an auger 97 to convey the grain to the main storage-bin 98. In FIG. 7A, the top of the elevator 96 and part of the auger 97 are shown to an enlarged scale, and the casing 108 includes inwardly projecting deflectors 108A which cause the falling grain to assume a tortuous path and to impinge upon a bank of transducers 99, each as above-described with reference to FIG. 6. In FIG. 7B, the outlet chute 10 is shown to an enlarged scale and the chute 10 has a transducer 99A as described with reference to FIG. 6.

Furthermore, as shown in FIG. 7 the combine harvester 1 includes an operator's station having an indicator 100 positioned thereon for quick and easy reading by the operator. In the indicator 100, schematically shown in FIG. 8, two channels are provided, one channel 109 for displaying a measure of the grain loss of the primary cleaning-apparatus of the combine, and the other channel for displaying a measure of the total quantity of grain stored per hour, in the main grain-storage bin.

Modifications may also be made to the indicator, for example the duct in FIGS. 2 to 5 may itself operate as the indicator in which case the duct is transparent and the operator views the grain in the duct directly. Thus, the two ducts described with reference to FIG. 2 may be positioned for visual inspection by the operator, the ducts each having markings or graduations thereon, for example bands of different colors round the ducts, so that the duct not actively collecting grain gives an indication of the operating efficiency of the grain separation process.

We claim:

1. A combine harvester thresher including a threshing mechanism, straw walkers to separate grain from the straw, a shaker shoe to clean the grain, a grain storage bin for storage of cleaned grain, an elevator to convey clean grain from the shaker shoe to the grain storage bin, a secondary grain separating unit which receives all the crop material leaving the straw walkers and separates the remaining grain if any, a secondary cleaning apparatus including a fan and a shaker shoe, conveyor means to convey the grain separated from the straw by the secondary grain separating unit from the secondary grain separating unit to the secondary cleaning apparatus, conveyor means to convey clean grain from the secondary cleaning apparatus to said grain storage bin, flow rate measuring apparatus to measure the rate of flow of grain from the secondary cleaning apparatus, flow rate measuring apparatus to measure the rate of flow of grain into the grain storage bin, and indicator means adjacent to the operator which indicates the flow rate of grain from the secondary cleaning apparatus and the total flow rate of all the grain entering the grain storage bin thereby indicating the efficiency of the straw walkers to the operator.

2. The combine harvester thresher of claim 1 wherein said flow rate measuring apparatus includes an electromechanical transducer.

3. The combine harvester thresher of claim 1 wherein said flow-rate measuring apparatus includes apparatus to measure the flow-rate by measuring the quantity of grain collected in a preselected period of time.

4. The combine harvester thresher of claim 1 wherein said flow-rate measuring apparatus includes apparatus to measure the flow rate by measuring the time required to collect a preselected quantity of grain.